US011411638B2

(12) United States Patent
Halperin et al.

(10) Patent No.: US 11,411,638 B2
(45) Date of Patent: Aug. 9, 2022

(54) AI POWER MANAGEMENT SYSTEM FOR EFFECTIVE DUTY CYCLE FOR SPACE CONSTELLATIONS

(71) Applicant: AST & Science, LLC, Miami, FL (US)

(72) Inventors: Adam H. Halperin, Silver Spring, MD (US); Raymond J. Sedwick, University Park, MD (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/175,360

(22) Filed: Feb. 12, 2021

(65) Prior Publication Data

US 2021/0258068 A1     Aug. 19, 2021

Related U.S. Application Data

(60) Provisional application No. 62/976,155, filed on Feb. 13, 2020.

(51) Int. Cl.
*H04B 7/185*     (2006.01)

(52) U.S. Cl.
CPC ..... *H04B 7/18513* (2013.01); *H04B 7/18519* (2013.01); *H04B 7/18534* (2013.01)

(58) Field of Classification Search
CPC ............ H04B 7/18513; H04B 7/18519; H04B 7/18534; H04B 7/18543
See application file for complete search history.

(56) References Cited

U.S. PATENT DOCUMENTS

| | | | |
|---|---|---|---|
| 6,678,520 B1 * | 1/2004 | Wang | H04B 7/18513 455/13.1 |
| 7,627,284 B2 * | 12/2009 | Wang | H04B 7/18513 455/13.1 |
| 9,973,266 B1 | 5/2018 | Avellan et al. | |
| 10,009,910 B2 * | 6/2018 | Reis | H04W 4/029 |
| 10,243,784 B2 * | 3/2019 | Gerszberg | H04B 3/54 |
| 10,616,061 B2 * | 4/2020 | Holley | H04N 21/44227 |
| 10,944,436 B1 * | 3/2021 | Buckley | G06N 3/08 |
| 2015/0207562 A1 * | 7/2015 | Brumley, II | G06N 5/022 398/125 |
| 2015/0318916 A1 * | 11/2015 | Gopal | B64G 1/1085 455/13.1 |
| 2015/0340875 A1 * | 11/2015 | Prasad | H02J 50/60 307/104 |
| 2016/0065006 A1 | 3/2016 | Woods | |
| 2016/0254854 A1 * | 9/2016 | Wharton | H04B 7/18519 455/12.1 |

(Continued)

*Primary Examiner* — Alpus Hsu
(74) *Attorney, Agent, or Firm* — Blank Rome LLP

(57) ABSTRACT

A ground station has a power management communication system for use with a satellite having one or more solar cells that generate solar power, an energy storage that collects solar power from the one or more solar cells and provides stored energy, and one or more electronic components. The power management communications system has a learning artificial intelligence algorithm that allocates solar power from the one or more solar cells and stored energy from the energy storage to the one or more electronic components, based on a number of factors including communication needs, adjustable parameters, and performance indicators. The user can indicate the desired communication to be achieved, and the system determines the appropriate operating parameters for the satellite.

14 Claims, 4 Drawing Sheets

(56) References Cited

U.S. PATENT DOCUMENTS

| | | | |
|---|---|---|---|
| 2017/0089968 A1* | 3/2017 | Bagul | G01R 29/10 |
| 2017/0149144 A1* | 5/2017 | Gallagher | H01Q 13/0258 |
| 2017/0250751 A1* | 8/2017 | Kargieman | G06K 9/46 |
| 2018/0158166 A1* | 6/2018 | Tulabandhula | G06Q 50/30 |
| 2018/0305042 A1* | 10/2018 | Vaughan | H04B 7/19 |
| 2018/0359022 A1* | 12/2018 | Avellan | H04B 7/024 |
| 2019/0238216 A1 | 8/2019 | Avellan et al. | |
| 2019/0349074 A1* | 11/2019 | Petranovich | H04B 7/19 |
| 2020/0346666 A1* | 11/2020 | Wray | B60W 60/0025 |
| 2021/0018916 A1* | 1/2021 | Thakur | G05D 1/0246 |

* cited by examiner

AI POWER MANAGEMENT SYSTEM FOR EFFECTIVE DUTY CYCLE FOR SPACE CONSTELLATIONS

RELATED APPLICATION

This application claims the benefit of priority of U.S. Provisional Application No. 62/976,155, filed on Feb. 13, 2020, the content of which is relied upon and incorporated herein by reference in its entirety.

BACKGROUND

U.S. Pat. No. 9,973,266 and U.S. Publ. No. 2019/0238216 show a system for assembling a large number of small satellite antenna assemblies in space to form a large array. The entire content of the '266 patent is incorporated herein by reference. As disclosed in the '266 Patent. FIGS. 1(a), 1(b) show a satellite communication system 100 having a phase array 102 of small satellites 104 and a central or control satellite 200. The small satellites 104 communicate with end users 500 within a footprint 400 on Earth, and also communicate with the control satellite 200, which in turn communicates with a gateway 600 at a base station. The small satellites 104 can each include, for example, a processing device (e.g., a processor or controller) and one or more antenna elements. And the control satellite 200 can include a processing device and one or more antenna or antenna elements.

A constellation is an arrangement of a plurality of phase array systems 100 in orbit around the Earth. A phase array system is a satellite that is made up of a plurality of satellite modules. Operation of a phase array for communication is accomplished through having all or a subset of coordinated satellite modules working to transmit and receive signals with end users.

The phase array communicates with end users on Earth as the primary goal of operation.

SUMMARY

The operation of a phase array must be actively duty cycled to ensure the efficient operation of the phase array for communication such that the energy state of the batteries do not exceed or fall below the permitted operating tolerances and that the desired communications are achieved.

Duty cycling of the phase array refers to varying the amount of electrical power that is dedicated to the purposes of communication through a period of time. A duty cycle of 100% means that the phase array is constantly communicating at its maximum capacity and is consuming electrical energy at its maximum rate for the entire time duration considered. A duty cycle of 0% means that the phase array is not providing any communications and is consuming electrical energy at its minimum rate for the entire time duration considered. A duty cycle of X % is defined as the time averaged operational state of the phase array. The operational state of the phase array is an instantaneous measure of the electrical power consumption of the phase array, where 100% refers to the maximum rate of electrical energy consumption and 0% refers to the minimum rate of electrical energy consumption.

The energy state of the phase array is the sum of the energy states of the batteries of each individual satellite module. The satellite modules operate in a coordinated manner and so the energy state of the phase array and the energy state of the satellite modules are considered equivalent and interchangeable for the discussion of the operation of the phase array as a whole.

Satellite modules each have and operate using their own independent power subsystem. The satellite modules have an array of solar cells that are used to generate electrical energy when they are exposed to light. The satellite modules also have a suite of batteries that are used to store and expend electrical energy. The satellite modules consume electrical energy for the purposes of communication either directly from the solar cell system or by drawing energy from the battery suite.

The operational state of the array is defined by a satellite's parameters that can be adjusted to suit a specific purpose. The adjustable parameters of a satellite, and therefore the operational state, are varied in real time based on the immediate communication need from the phase array, the available power being received from the solar cells, the energy stored in the batteries, and predictions on the future operational state profile of the array.

An operational state of the phase array that consumes less power than is generated by the solar cells is called "power positive" and there is an excess electrical energy. Excess electrical energy is stored in the batteries of the satellite modules and can be expended later. An operational state of the phase array that consumes more power than is generated by the solar cells is called "power negative" and causes an electrical energy deficit. Deficits of electrical energy are accommodated by drawing from electrical energy stored in the batteries of the satellite modules. Excesses and deficits of electrical energy are only acceptable within the limitations of the batteries.

The communications need for the phase array is driven by which end users on Earth are visible to the array and whether those end users are visible to other phase arrays within the constellation. An end user is considered visible to an array whenever communication between the two is possible. The generation of power for the phase array is based on the exposure of the solar cells to light and is based on the orbital and attitude characteristics of the array and the seasonal characteristics of the Earth relative to the Sun. Finally, the amount of energy stored in the batteries is based on the time history of electrical energy consumption and generation and is a function of the previous communications performed by the phase array and its position within its orbit. By intelligently considering and accounting for the differing nature of the drivers for energy consumption, energy generation, and battery state, an efficient time varying operational state of the phase array(s) can be predicted and enacted.

DESCRIPTION

Figure 1A:
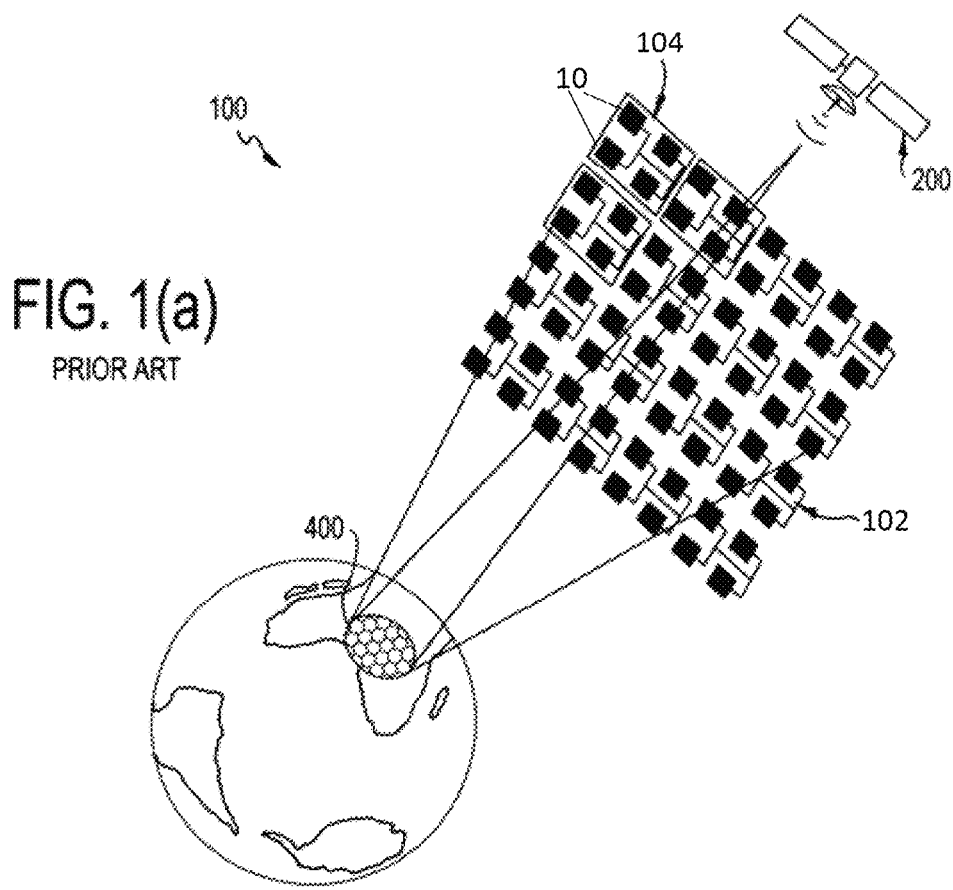
FIGS. 1(a), 1(b) show a conventional structural array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 2:
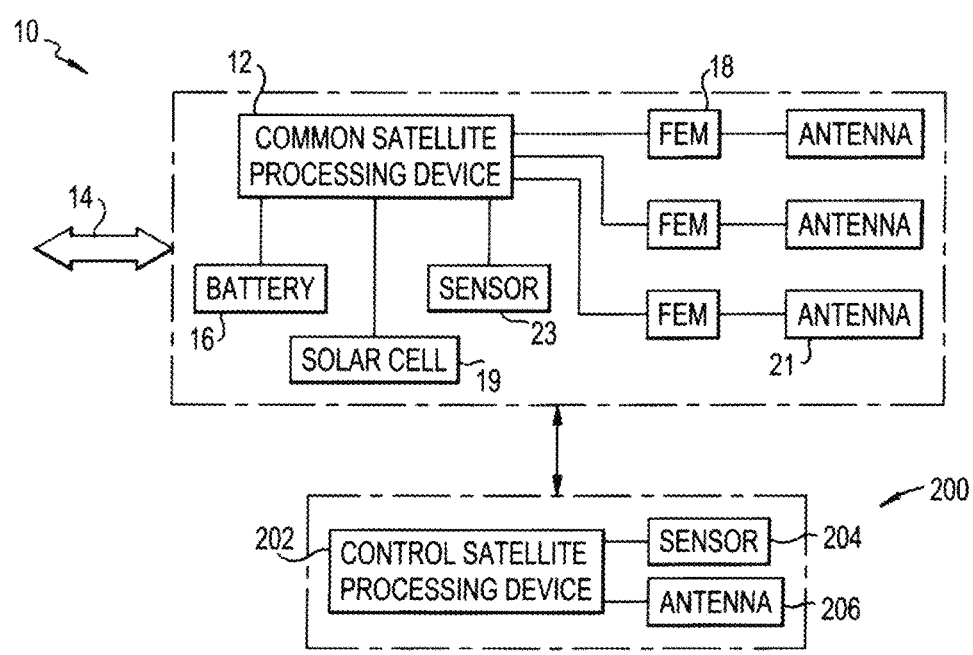
FIG. 2 is a block diagram of a common satellite and a control satellite.

Turning to the drawings, FIG. 2 shows a structural assembly 10, here an antenna assembly or common satellite, in accordance with one example embodiment of the invention. The antenna assembly 10 can be utilized in any satellite system, such as the satellite communication system 100, a phased array, of FIGS. 1(a), 1(b). The antenna assembly 10 can also be utilized separately by itself or for other purposes than for an antenna or communications. The antenna assembly 10 includes a processing device 12, data cable 14, battery 16, one or more antennas 21 (with antenna elements), one or more front end modules (FEM) 18 that each control transmitting and receiving via a respective antenna 21, and a solar cell 19. In one example embodiment, the antenna assembly 10 is configured to be utilized in combination with a plurality of antenna assemblies to form a large antenna array in space, such as the phase array 102 shown in FIG. 1(a). The individual antenna assemblies 10 are structurally and/or electrically coupled together in great numbers to form a large structure in space, such as the antenna assemblies 10 used in the phase array 102 of FIGS. 1(a), 1(b). Thus, each antenna assembly or common satellite 10 has communication components (e.g., processor 12, antennas 21. FEIN A 18), and noncommunication components such as for example power components (e.g., solar cell 19, battery 16), and other components such as sensors 23 and navigation components (e.g., thrusters, flight computer).

Figure 1B:
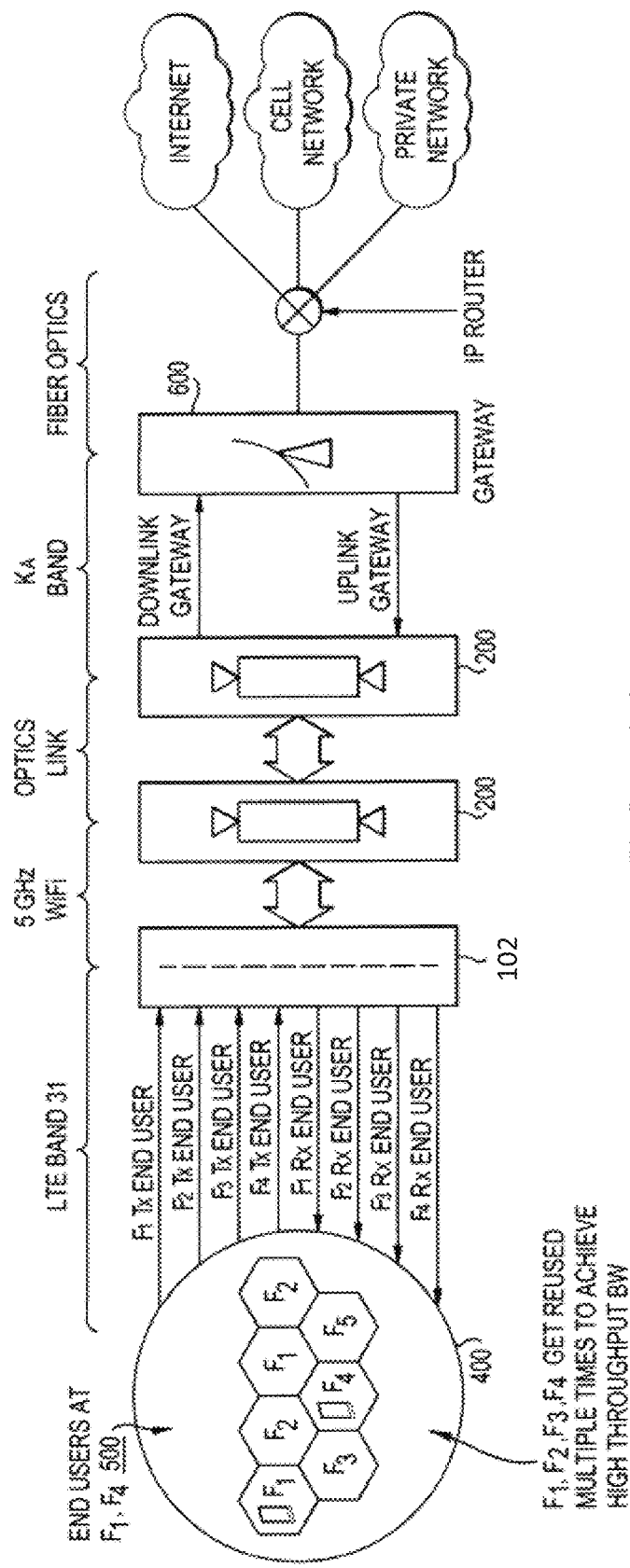

The control satellite 200 (FIGS. 1(a), 1(b), 2) has a control processor 202 that communicates with the common satellite processor 12. The control satellite 200 can be structurally connected to the common satellite phase array 102 or separated from the phase array 102, and communicate either by wire or wirelessly with the common satellites 10. The control satellite 200 can also have one or more sensors 204 and one or more antennas 206 that communicate with abase station antenna 56 (see FIG. 3). The control satellite antenna 206 transmits and receives data to/from a base station(s) 50.

Figure 3:
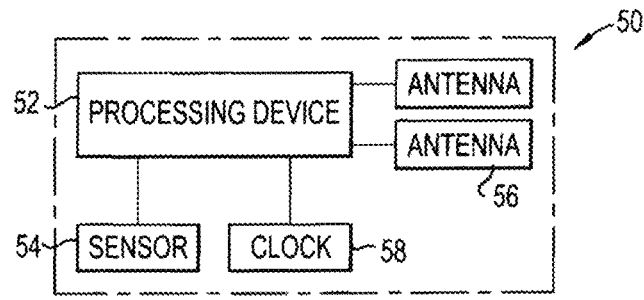
FIG. 3 is a block diagram of the base station.

FIG. 3 shows a base station 50 that is located on the ground and communicates with the control satellite 200. The base station 50 has a base station processor 52, one or more antennas 54 located at the base station or remotely, and one or more sensors 54. The base station 50 can operate as a gateway 600 (FIG. 1(b)) to communicate with the control processor 202 at the control satellite 200. Thus, the base station processing device 52 communicates with the control satellite processor 202 and/or the common satellite processor 12 via the base station antennas 54 and the control satellite antennas 206. The base station can also include other standard components, such as a database or memory to store data and information, user input devices, and a display device.

Accordingly, the base station processor 52 sends control signals to the control satellite processor 202 and/or the common satellite processor 12 to control operation of the electronic components (e.g., communication and non-communication components) based on the results of the base station processor analysis. The control signals enable the base station processor 52 to control the operating parameters of the common satellites 10 and/or the control satellite 200. Those operating parameters include, for example, communication parameters (e.g., turn ON/OFF, increase power to the beams), and non-communication parameters such as for example flight parameters (e.g., change the position/orientation of the satellite toward/away from the sun), and power parameters (e.g., direct energy from the solar cells to the battery, direct stored energy from the battery to the communication or non-communication components).

Figure 4:
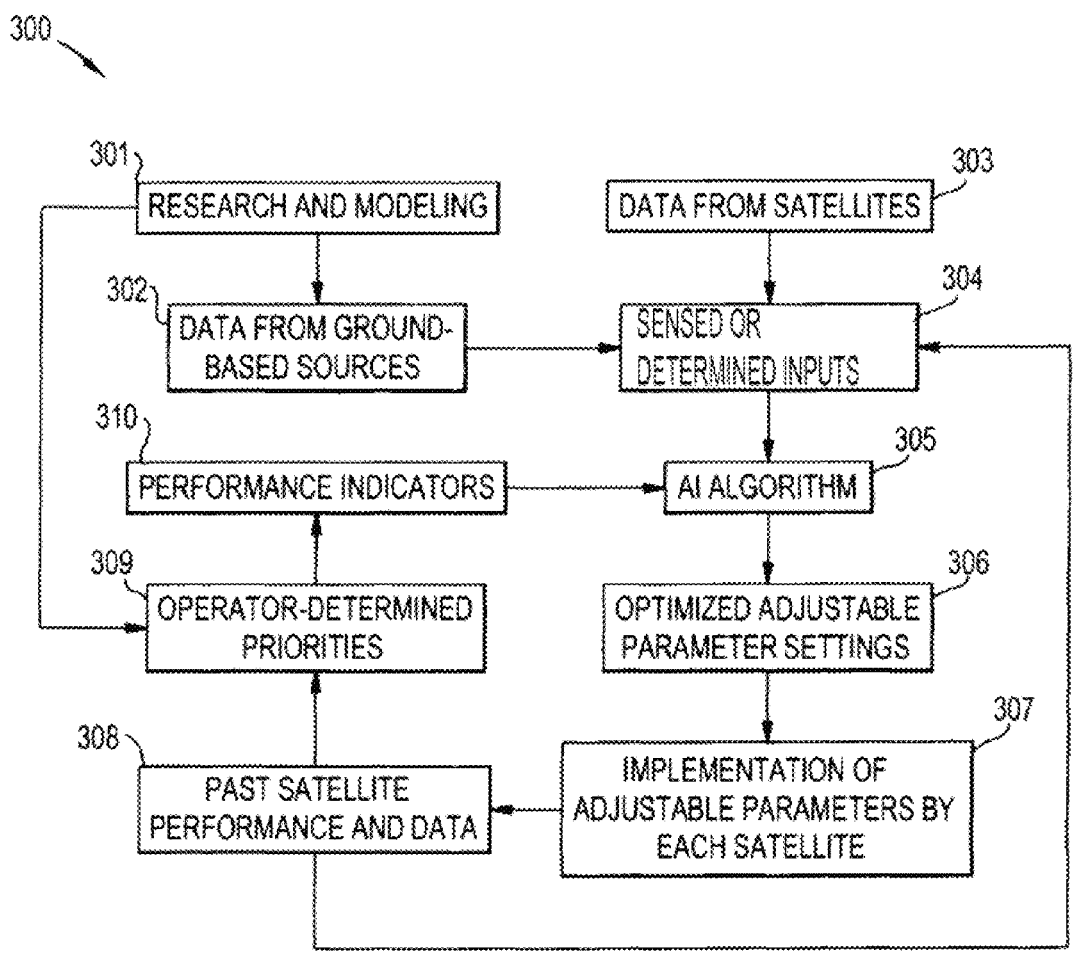
FIGS. 4-5 are flow diagrams depicting operation of the system.

FIG. 4 shows an artificial intelligence (AI) power management system 300 in accordance with one example embodiment of the present disclosure. The AI power management system 300 can be located at and operated by the base station processing device 52, which coordinates all of the phased arrays 102 and control satellites 200 in the constellation. In other embodiments it can be operated by the control processor 202 or the common satellite processor 12. The AI power management system 300 and in the current embodiment the base station processor 52, controls all adjustable parameters of the satellite. Adjustable parameters are high level decisions that impact the behavior of a satellite or the constellation on the whole. Background tasks (e.g. heaters maintaining temperature or data passing from one point to another) are lowlevel and do not require advanced decision making, so are not controlled by the AI power management system 300. The background tasks are often affected by or are consequences of adjustable parameter decisions.

Figure 5:
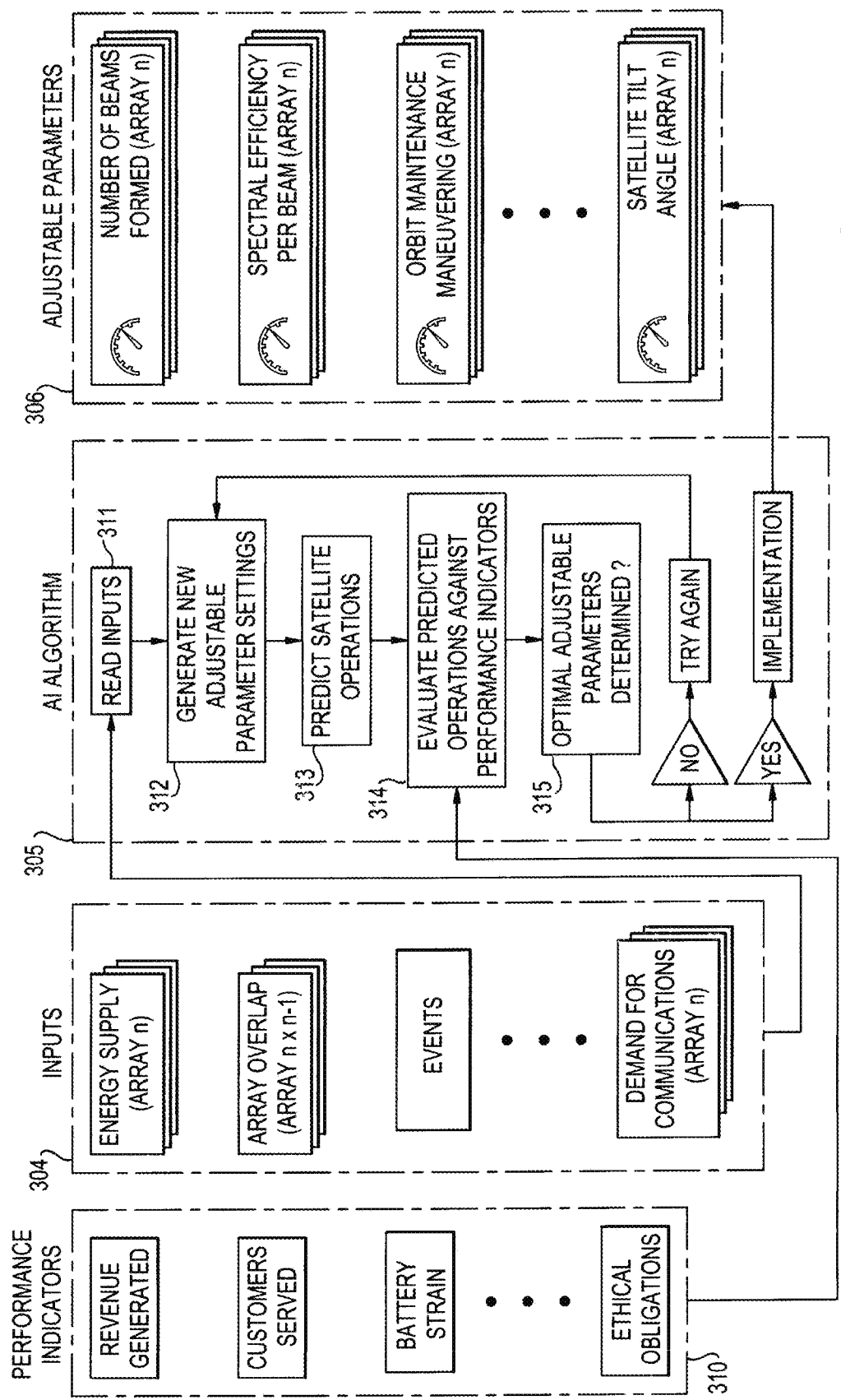

In particular, referring to FIGS. 4, 5, the processor 52 can implement an algorithm that accepts (a) sensed or determined inputs 304 and returns instructions for each satellite's (b) adjustable parameters 306 by optimizing the adjustable parameters 306 according to a set of (c) performance indicators 310.

The (a) sensed or determined inputs 304 (FIGS. 4, 5) inform the processor 52 what is happening and what is expected to happen in the future. Those can include, for example, (i) communication demands (e.g., user density, population distribution statistics, number of users across all cells, geographic location, prior usage patterns, time of day (night/daylight, business hours, rush hour), time of week (weekend, weekday), time of year, etc.), (ii) energy supply (e.g., season, solar season, current orbit, satellite position within the orbit, satellite orientation (this covers tilt to face Sun/Earth)), (iii) energy state (e.g., this is the state of the battery 16 of each common module 10, for example, available power) and/or state of the satellite (fully operational, failed components), (iv) energy demand (e.g., power consumed by each component on the satellite as a function of the adjustable parameters), (v) array overlap (e.g., all factors (i)-(iii) above for each other satellites in the constellation are taken into account, (vi) user-defined inputs (e.g., the introduction of a new transatlantic flight path that shall be serviced), and (vii) events (e.g., things that impact communication like weather, solar flares, etc.).

The (i) communication demands can also be based, for example, on the geographic location of the phased array 102 and the communication demands for those locations, such as based on country, revenue per user, presence of other satellites, current satellite throughput, and position of celestial bodies.

The (b) adjustable parameters 306 (FIGS. 4, 5) are those that the processor 52 can adjust to achieve optimal performance. Those can include, for example, (i) satellite communications parameters (e.g., how many beams are formed, spectral efficiency in each beam, bandwidth allocation, power distribution per beam (in synch with the base station eNodeB), etc.), and (ii) non-communications parameters (e.g., attitude control (which can impact power received and/or improve beamforming to customers), attitude determination, orbit maintenance, system calibration, tilt (such as to face the sun or Earth), etc.).

The (c) performance indicators 310 (FIGS. 4, 5) are outputs that measure performance. Those can include, for example, (i) communication outputs (e.g., revenue generated, revenue per user, data transmitted (throughput) by the satellites 10, 200, data received (throughput) by the satellites 10, 200, customers served, customers missed, service quality, time on, ethical/commercial obligations met/unmet, etc.), (ii) non-communications outputs (e.g., power consumed vs. power available, battery strain (e.g., time-history of battery energy states), strain imposed on other systems, operational state time-history, service to each cell on the Earth's surface, etc.), and (iii) user-defined performance indicators (e.g., anything a user can input as desired to inform the satellite how it should operate, which can effectively override the AI optimization or just become a factor within that slightly modifies satellite behavior). For example, indicators like revenue generated are retrospective assessments of how well the constellation performed. If the AI algorithm tried providing service to a first country instead of a second country and generated $20,000 more dollars than the average, it uses that information. In that case, the AI would learn to increase service to the first country and devalue service to the second country.

In addition, the AI power management system 300 can include one or more sensors 23, 54, 204 or devices that provided the inputs (a) either located at the base station 50 (FIG. 3), the control satellite 200 (FIG. 2), and/or the common satellites 10 (FIG. 2). For example, the processor 52 can have a clock 58 that provides time of day; time of week, solar season, etc. The common satellite 10 can have a sensor 23 or the common satellite processor 12 can monitor the battery 16 for usage or other variables such as temperature, attitude, tilt, or state of the satellite 10. Still other information can be received from other sources such as ground-based sources and/or research and modeling, including online reference databases or the like, for example revenue per user, country affluence, etc. Information about the satellites 10 (e.g., energy state, orientation/position, etc.) are sent to the base station 50 by the control satellite's antennas 206. Information about the customer behavior is meta-data collected (either by reviewing satellite operational data or acquired from a third party source) and stored in servers either at the base station or somewhere the base station can access it freely. User-defined inputs are input by an operator at the base station or a remote location to the base station. Information about events is sent from a third party system or input by an operator at the base station or remotely.

The processor 52 can implement an artificial intelligence (AI) learning algorithm that figures out the optimal adjustable parameter settings to best satisfy the performance indicators. In one embodiment, the performance indicators are operator-weighted to, in effect, determine the value of operating at a given time or with certain consumers. If the calculated value is over a threshold, then you turn the satellites 10, 200 ON or otherwise adjust operational parameters of the satellites 10, 200. That is, the operator can create a weighting function to judge predicted and actual AI performance, such as:

$$Value = Revenue\ Generated*X - Customers\ Missed*Y + Active\ Satellite\ Time*Z$$

Where X, Y, and Z are operator-defined value weightings. In this manner, the AI processor 52 generates initial data by optimizing the behavior of simulated satellites and consumers. As the AI algorithm learns, the operator may identify additional performance indicators or change their weightings, which can be implemented to affect AI algorithm behavior. Once sufficient simulated testing has been developed, the AI algorithm is used to control real satellites in orbit, but the process of adjusting performance indicators and their weightings can continue.

In addition, there can be room in the value function for further user-defined inputs. For example, the satellite might see an abnormal number of users active in a small region of Pennsylvania, but not know why. It could be 100,000 people using their phones because they are at a football game or 100,000 people using their phones because of a wildfire, but a person at a control center can receive a government alert and then command the satellites to hyper-prioritize serving that region. This would be enacted by the addition of an operator-defined temporary performance indicator to the algorithm operated by the base station processor 52, for example:

$$Value = Revenue\ Generated*X - Customers\ Missed*Y + Active\ Satellite\ Time*Z + UserInput*A$$

In this way, an operator can continually apply weighted factors to affect the satellite behavior.

As seen in FIG. 4, the AI algorithm takes information as sensed or determined inputs 304 as well as weighted performance indicators 310. The output of the AI algorithm are the adjustable parameters 306 for each satellite 10, which are equivalent to instructions for each satellite on how to operate.

The sensed or determined inputs 304 include data from ground-based sources 302, which includes research and modeling 301, weather events, user-defined information (e.g. festivals/holidays), etc. The research and modeling 301 is consumer modeling such as third-party consumer data, modeling of satellite components, etc.

The sensed or determined inputs 304 also includes data from Satellites 303. That is raw and/or processed data produced by relevant satellite components and sent to the AI algorithm for use. For example, that includes information from various sensors 23 (FIG. 2). The data from the ground 302 and the satellites 303 form the sensed or determined inputs 304, which are fed into the AI Algorithm 305. The AI algorithm 305 is the learning algorithm that processes the inputs and selects optimal adjustable parameter settings according to performance indicators. The AI algorithm 305 is implemented by the ground station processing device 52 (FIG. 3), though in other embodiments can be implemented by the control satellite processing device 202 or the common satellite processing device 12 (FIG. 2). The AI algorithm also receives Past Satellite Performance and Data 308 as part of the second or determined inputs 304 to reinforce learned strategies. Past Satellite Performance and Data 308 contains the information of what adjustable parameter settings were used and the corresponding performance achieved. Correlations between the adjustable parameters and performance are then used to drive future decision making for the AI algorithm.

The Performance Indicators 310 are weighted indicators that the AI algorithm uses to judge its performance. The AI algorithm 305 analyzes the sensed or determined inputs 304 and the performance indicators 310, and generates optimized adjustable parameter settings 306. The optimized parameter settings 306 are instructions (e.g., control signals from the ground station processing device 52 to the common satellite processing device 12) for how each common satellite 10 shall operate in the future, until new instructions are received by the AI algorithm.

At step 307, the Adjustable Parameters are implemented by each satellite 10. This is the common satellites 10 (e.g., at the common satellite processing device 12) receiving the adjustable parameter information from the ground station (e.g., ground station processing device 52) and enacting it. Past Satellite Performance and Data 308 is the recorded satellite 10 performance and the associated adjustable parameter settings used. The purpose of past satellite performance data is to derive the actual correlations between adjustable parameters and the performance indicators 310.

Thus, the Operator-Determined Priorities 309 are used to generate and weight the performance indicators. The operator makes the decisions on what factors the AI Algorithm 305 should value (e.g. service quality vs. service consistency). The operator can base their priorities on observing Past Satellite Performance Data 308 as well as Research and Modeling 301. For example, if consumer research 301 indicates that a specific country has a particularly fast-growing population of cell phone users, then the operator may specifically prioritize service to that country. Another example being an operator that observes (by viewing Past Satellite Performance Data 308) that a small island nation is not receiving service, despite a commercial obligation to said nation, leading to a corrective re-weighting of the corresponding performance indicators.

Accordingly, steps 306-310 form a feedback loop with the AI algorithm 305. The user can provide input, step 309, that has the consequence of affecting the optimized parameter settings 306 output from the algorithm 305. That user input is provided as user-weighted performance indicators 310 that are fed back into the AI algorithm 305, which in turn adjusts the optimized parameter settings 306.

Referring to FIGS. 4, 5, the AI algorithm process iteratively seeks optimal adjustable parameters through predicting satellite and consumer behavior and analyzing the impacts of adjustable parameter choice. At step 311, the algorithm 305 reads the sensed or determined input 304 to form the basis of current and predicted satellite and consumer behavior. At step 312, the algorithm 305 generates a new set of current and future adjustable parameter settings for each satellite 10. This is an attempted optimization of current and future satellite adjustable parameter settings that may or may not be adopted by the satellites 10, depending on the predicted optimality of these settings.

At step 313, the AI algorithm 305 predicts what will happen to the satellite array 300 (including the affixed control satellite 200 and satellites 10) and the consumers if the adjustable parameter settings generated in the previous step were to be adopted. It then evaluates the Predicted Operations Against Performance Indicators, step 314. Here, the AI algorithm uses the prediction generated in the previous step and the performance indicators 310 to evaluate the optimality of the adjustable parameter settings used. Turning to step 315, the AI algorithm uses an optimality condition to determine if the adjustable parameter settings currently being assessed are suitable for implementation. If no (the adjustable parameter settings are deemed sub-optimal), a new set of adjustable parameter settings are generated. If yes (the adjustable parameter settings are deemed optimal), the adjustable parameter settings are adopted by each satellite 10.

The control satellite 200 and/or antenna assemblies 10 (e.g., antennas or antenna elements) communicate with processing devices on Earth, such as for example a wireless device including a user device (e.g., cell phone, tablet, computer) and a ground station. The present disclosure also includes the method of utilizing the antenna assemblies 10 to communicate (i.e., transmit and/or receive signals to and/or from) with processing devices on Earth. The present disclosure also includes the method of processing devices on Earth communicating (i.e., transmit and/or receive signals to and/or from) with the antenna assemblies 10. In addition, the antenna assemblies 10 can be used in Low Earth Orbit (LEO) or in other orbits or for other applications. Sill further, while the system has been described as for an array of antenna assemblies, the system can be utilized for other applications, such as for example data centers, reflectors, and other structures, both implemented in space or terrestrially.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A power management communication system for use with a satellite having adjustable parameter settings, the power management communication system comprising:
   an antenna; and
   a processing device coupled to the antenna, the processing device configured to:
      receive sensed or determined inputs with respect to the satellite;
      receive performance indicators; and
      implement a learning artificial intelligence algorithm to optimize the adjustable parameter settings based on analysis of the performance indicators and the sensed or determined inputs, wherein the sensed or determined inputs include an energy state of the satellite.

2. The power management communication system of claim 1, wherein the adjustable parameter settings include a flight parameter.

3. The power management communication system of claim 1, the satellite having one or more solar cells that generate solar power, an energy storage that collects solar power from the one or more solar cells and provides stored energy, wherein the adjustable parameter settings include
   a power parameter that allocates solar power from the one or more solar cells and stored energy from the energy storage based on communication needs and the energy state of the satellite.

4. The power management communication system of claim 1, wherein said processing device is located at a ground station.

5. The power management communication system of claim 1, wherein said processing device is configured to implement the learning artificial intelligence algorithm to adjust a duty cycle of power dedicated to communications for each satellite of a phase array.

6. The power management communication system of claim 1, wherein the antenna is a ground station antenna.

7. The power management communication system of claim 1, wherein the sensed or determined inputs include one or more of the following inputs: prior patterns of communication usage for a geographic location based on country, season, solar season, population distribution statistics, time of day, and weekend/weekday.

8. The power management communication system of claim 1, wherein the sensed or determined inputs include energy state and one or more of the following inputs: energy supply, energy demand, and satellite overlap.

9. The power management communication system of claim 1, wherein the adjustable parameter settings include one or more of the following: number of beams formed, spectral efficiency in each beam, bandwidth allocation, and power distribution per beam.

10. The power management communication system of claim 1, wherein the performance indicators include any one or more of the following: revenue generated, revenue per user, data transmitted, data received, customers served, customers missed, service quality, time on, and ethical/commercial obligations met/unmet.

11. The power management communication system of claim 1, wherein the performance indicators include any one or more of the following: power consumed, battery strain, strain imposed on other systems, and operational state over time.

12. The power management communication system of claim 1, wherein the satellite communicates directly with a wireless device on the ground.

13. A power management communication system for use with a satellite that communicates directly with a wireless device on the ground, the satellite having one or more solar cells that generate solar power, energy storage that collects solar power from the one or more solar cells and provides stored energy, the power management communications system comprising:

an antenna; and a processing device coupled to the antenna, the processing device configured to:
receive sensed or determined inputs with respect to the satellite;
receive performance indicators; and
implement a learning artificial intelligence algorithm to optimize adjustable parameter settings of the satellite based on analysis of the performance indicators and the sensed or determined inputs, wherein the sensed or determined inputs include an energy state of the satellite.

14. A method for controlling operating parameters of a satellite, the method comprising:

receiving, by a processing device, sensed or determined inputs with respect to the satellite;

receiving, by the processing device, performance indicators; and implementing, by the processing device, a learning artificial intelligence algorithm to optimize adjustable parameter settings of the satellite based on analysis of the performance indicators and the sensed or determined inputs, wherein the sensed or determined inputs include an energy state of the satellite.

* * * * *